(12) United States Patent
Michalakis (10) Patent No.: US 10,449,671 B2
(45) Date of Patent: Oct. 22, 2019

(54) METHODS AND SYSTEMS FOR PROVIDING ROBOTIC OPERATION CONSTRAINTS FOR REMOTE CONTROLLABLE ROBOTS

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 232 days.

(21) Appl. No.: 15/478,735

(22) Filed: Apr. 4, 2017

(65) Prior Publication Data

US 2018/0281179 A1    Oct. 4, 2018

(51) Int. Cl.
*B25J 9/16*    (2006.01)

(52) U.S. Cl.
CPC ............. *B25J 9/161* (2013.01); *B25J 9/1666* (2013.01); *B25J 9/1676* (2013.01); *G05B 2219/40131* (2013.01)

(58) Field of Classification Search
USPC ................................................. 700/245–264
See application file for complete search history.

(56) References Cited

U.S. PATENT DOCUMENTS

| | | | |
|---|---|---|---|
| 6,274,839 B1 * | 8/2001 | Stone | B23K 9/04 219/125.1 |
| 8,781,629 B2 * | 7/2014 | Ota | B25J 9/1664 318/568.12 |
| 8,886,829 B1 | 11/2014 | Poursohi et al. | |
| 9,014,857 B2 | 4/2015 | Ota et al. | |
| 9,050,723 B1 | 6/2015 | Elazary et al. | |
| 9,128,476 B2 | 9/2015 | Jung et al. | |
| RE45,870 E * | 1/2016 | Wang | B25J 5/007 |
| 9,402,518 B2 | 8/2016 | Burlutskiy | |

(Continued)

FOREIGN PATENT DOCUMENTS

| | | |
|---|---|---|
| JP | 2008221363 A | 9/2008 |
| WO | 2014088994 A1 | 6/2014 |

OTHER PUBLICATIONS

International Search Report and Written Opinion dated Jul. 7, 2018 for International Application No. PCT/US2018/023777 filed on Mar. 22, 2018.

*Primary Examiner* — Jonathan L Sample
(74) *Attorney, Agent, or Firm* — Dinsmore & Shohl LLP (57) ABSTRACT

A method of constraining operation of a robot includes receiving, using network interface hardware of a robot, one or more robotic control instructions from a user, where the robotic control instructions instruct the robot to perform a robotic movement, determining whether the user providing the one or more robotic control instructions to the robot is a primary user or a secondary user, and comparing the robotic movement instructed by the one or more robotic control instructions with one or more robotic operation constraints. The method further includes determining whether the robotic movement instructed by the one or more robotic control instructions conflicts with the one or more robotic operation constraints and constraining operation of the robot when the user is the secondary user and the robotic movement instructed by the one or more robotic control instructions conflicts with the one or more robotic operation constraints.

20 Claims, 6 Drawing Sheets

(56) References Cited

U.S. PATENT DOCUMENTS

| | | | |
|---|---|---|---|
| 9,434,072 B2 | 9/2016 | Buehler et al. | |
| 9,457,468 B1 * | 10/2016 | Elazary | G06F 11/0793 |
| 9,486,921 B1 | 11/2016 | Straszheim et al. | |
| 9,486,924 B2 | 11/2016 | Dubrovsky et al. | |
| 10,019,566 B1 * | 7/2018 | Gallagher | G06F 21/44 |
| 2009/0064320 A1 * | 3/2009 | Okamoto | G06F 21/32 |
| | | | 726/19 |
| 2012/0150345 A1 * | 6/2012 | Baltes | G05D 1/0274 |
| | | | 700/245 |
| 2012/0185095 A1 * | 7/2012 | Rosenstein | B25J 5/007 |
| | | | 700/259 |
| 2013/0343640 A1 * | 12/2013 | Buehler | B25J 9/0087 |
| | | | 382/155 |
| 2013/0345875 A1 * | 12/2013 | Brooks | B25J 9/0087 |
| | | | 700/259 |
| 2014/0123309 A1 * | 5/2014 | Jung | G06F 21/6245 |
| | | | 726/27 |
| 2015/0190925 A1 * | 7/2015 | Hoffman | B25J 9/161 |
| | | | 700/257 |
| 2015/0326707 A1 * | 11/2015 | Lee | H04W 12/08 |
| | | | 455/420 |
| 2015/0336270 A1 * | 11/2015 | Storr | B25J 9/1674 |
| | | | 700/245 |
| 2016/0257000 A1 * | 9/2016 | Guerin | B25J 9/1605 |

* cited by examiner

FIG. 6

METHODS AND SYSTEMS FOR PROVIDING ROBOTIC OPERATION CONSTRAINTS FOR REMOTE CONTROLLABLE ROBOTS

TECHNICAL

The present specification generally relates to control of robotic devices and, more specifically, methods and systems for providing robotic operation constraints for remotely controllable robots.

BACKGROUND

Robotic devices are increasingly being used in a wide-variety of applications, such as in healthcare, manufacturing, and user-assistive applications. While robots are becoming increasingly autonomous, robots may still perform tasks in response to user input. Further, as the use of robots becomes more widespread, robots have become interconnected with many different end-users, for example, via crowd sourcing technology. As one example, a robot's owner may allow other users to control the robot to perform tasks, such as cleaning, laundry, or the like. However, the owner may not want to allow this other user to have full control of the robot, for example, while the other user is operating the robot remotely, in the owner's home, business, or the like.

Accordingly, a need exists for methods and systems for providing robotic operation constraints for remotely controllable robots to constrain a non-owner user's control of a robot.

SUMMARY

In one embodiment, a method of constraining operation of a robot includes receiving, using network interface hardware of a robot, one or more robotic control instructions from a user, where the robotic control instructions instruct the robot to perform at least one robotic movement, determining whether the user providing the one or more robotic control instructions to the robot is a primary user or a secondary user, and comparing the at least one robotic movement instructed by the one or more robotic control instructions with one or more robotic operation constraints. The method further includes determining whether the at least one robotic movement instructed by the one or more robotic control instructions conflicts with the one or more robotic operation constraints and constraining operation of the robot when the user is the secondary user and the at least one robotic movement instructed by the one or more robotic control instructions conflicts with the one or more robotic operation constraints.

In another embodiment, a robot control system includes a robot having network interface hardware, a human-robot interface apparatus communicatively coupled to the robot, one or more processors, one or more memory modules communicatively coupled to the one or more processors. The robot control system further includes machine readable instructions stored in the one or more memory modules that cause the robot control system to perform at least the following when executed by the one or more processors: receive, using the network interface hardware of the robot, one or more robotic control instructions from a user, where the robotic control instructions instruct the robot to perform at least one robotic movement, determine whether the user providing the one or more robotic control instructions to the robot is a primary user or a secondary user, compare the at least one robotic movement instructed by the one or more robotic control instructions with one or more robotic operation constraints, determine whether the at least one robotic movement instructed by the one or more robotic control instructions conflicts with the one or more robotic operation constraints, and constrain operation of the robot when the user is the secondary user and the at least one robotic movement instructed by the one or more robotic control instructions conflicts with the one or more robotic operation constraints.

In yet another embodiment, a method of establishing one or more robotic operation constraints includes receiving, using network interface hardware of a robot, a plurality of control instructions from a user such that the robot performs a plurality of robotic movements, where each individual robotic movement of the plurality of robotic movements is based on an individual control instruction of the plurality of control instructions, and storing robotic movement patter information regarding each of the plurality of robotic movements in one or more memory modules. Further, the method includes establishing, using a processor communicatively coupled to the one or more memory modules, the one or more robotic operation constraints based on robotic movement pattern information regarding each of the plurality of robotic movements.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the drawings, embodiments described herein are directed toward methods and systems for providing robotic operation constraints for remotely controllable robots. Embodiments allow a primary user of a robot, (e.g., the owner of the robot, a registered user of the robot, or the like) to set one or more robotic operation constraints on the operation of the robot. Thus, when a secondary user operates the robot, (e.g., a non-owner user, a remote user, or the like), the robot may only perform a subset of all the robotic movements that the robot is able to perform and the robot may only operate within a portion of the operation environment in which the robot is located. As a non-limiting illustrative example, the primary user may want the robot to perform a laundry folding task but may not want to control the robot during the laundry folding task. Thus, the primary user may request that a secondary user control the robot and perform the laundry folding task, for example, for payment. However, while the primary user wants the secondary user to perform the laundry folding task, the primary user may not want the secondary user to move the robot into certain regions of the operation environment (e.g., the primary user's house) and/or may not want robot to perform certain robotic movements when the secondary user is operating the robot. Thus, using the embodiments described herein, the primary user may generate one or more robotic operation constraints such that the primary user may limit the robotic movements the secondary user may instruct the robot to perform and limit the locations that the secondary user may instruct the robot to enter. Various embodiments of methods and systems for providing robotic operation constraints for remotely controllable robots will be described herein with specific reference to the appended drawings.

Figure 1:
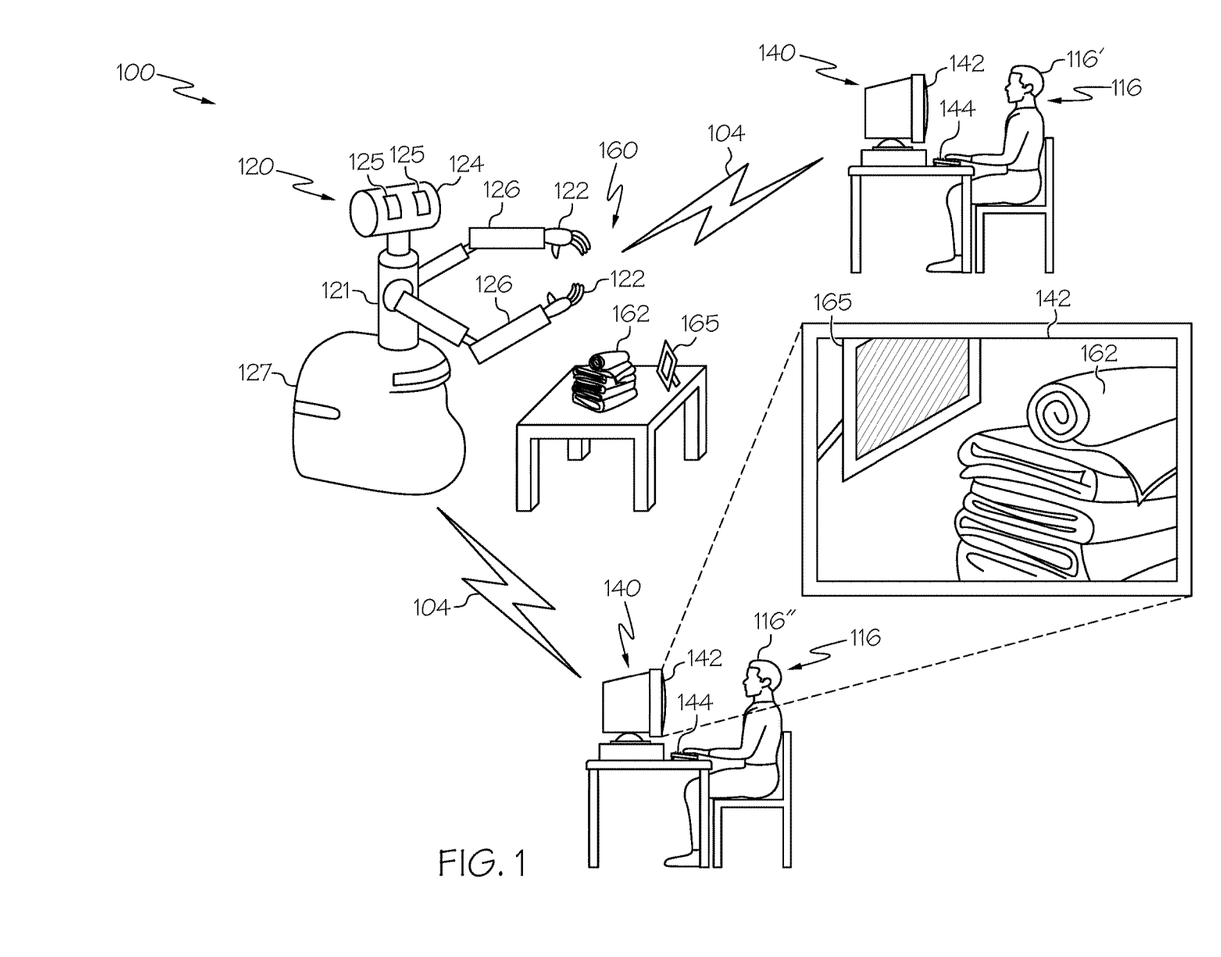
FIG. 1 schematically depicts a robot control system including a robot located in an operating environment and a human-robot interface apparatus communicatively coupled to the robot according to one or more embodiments shown and described herein.

Referring now to FIG. 1, a robot control system 100 is depicted wherein a user 116, such as a primary user 116' (e.g., a registered user, a robot owner, or the like) or a secondary user 116" (e.g., a non-owner user, a remote user, or the like) may control a robot 120, for example, by providing one or more robotic control instructions to the robot 120 via one or more human-robot interface apparatuses (HRIs) 140. As depicted in FIG. 1, the robot 120 may be located in an operation environment 160. The user 116 may be in the operation environment 160 or may be remote from both the robot 120 and the operation environment 160. It is noted that although the robot control system 100 is described in the context of servant robot applications (i.e., applications in which the robot assists people with everyday tasks embodiments are not limited thereto.

While the robot control system 100 is described herein primarily in reference to a user controlled operation of the robot 120, in some embodiments, the robot 120 may also comprise autonomous operation functionality. For example, the robot 120 can operate in both an autonomous mode and a controlled mode (e.g., a mode in which the robot 120 is fully or partially controlled by the user 116). For example, during a laundry folding task, the robot 120 may operate in an autonomous mode to travel from its present location in the operation environment 160 to the location of the laundry. Once at the laundry, the robot 120 may switch from the autonomous mode to the controlled mode and may then perform the laundry folding task in response to instructions received from the user 116.

The illustrated robot 120 comprises a head portion 124, one or more arms 126, one or more manipulator hands 122, and a locomotion base 127. It should be understood that the embodiments described herein are not limited by the configuration of the robot 120 depicted in FIG. 1, and that the robot 120 may be of any shape and size. The robot 120 includes a robot wireless communications module (e.g., network interface hardware 112 of FIG. 2) that transmits and receives wireless signals to and from the one or more HRIs 140. In this manner, the robot 120 is in wireless communication with the one or more HRIs 140. The robot 120 may send various signals to the HRI 140, such as video signals, location signals, power-level signals, health signals, etc. The HRI 140 may send various signals to the robot 120, such as control signals corresponding to a robotic movement patterns, autonomous navigation initiation signals (e.g., instructions to travel to point A), remote control signals (e.g., manual control signals), etc.

As depicted in FIG. 1, the robot 120 comprises one or more cameras 125 (or other visual sensors) that may visually capture what the robot 120 sees as it navigates within a space, e.g., the operation environment 160. In the illustrated embodiment, the one or more cameras 125 are located the head portion 124 of the robot 120. It should be understood that the one or more cameras 125 may be located at other regions of the robot 120. In operation, images produced by the one or more cameras 125 may be wirelessly transmitted to the HRI 140 over the communication path 104 such that the images are received by the HRI 140. Thus, as depicted in FIG. 1, the HRI 140 may display on a display interface 142, the images produced by the one or more cameras 125 of the robot 120.

In particular, the HRI 140 may display on the display interface 142 a visual representation of the operation environment 160. In some embodiments, the HRI 140 may comprise a virtual reality unit and the visual representation of the operation environment 160 may be augmented to depict a virtual reality of the operation environment 160. In some embodiments, for example, when the secondary user 116" is controlling the robot 120, the display interface 142 may display an augmented visual representation of the operation environment 160 to generate a virtual game within the operation environment 160. Thus, the secondary user 116" may be incentivized to control the robot 120 and perform one or more tasks as part of the virtual game. Further, in some embodiments when the secondary user 116" is controlling the robot 120, the display interface 142 may display an augmented visual representation of the operation environment 160 that distorts at least a portion of the visual representation of the operation environment 160. In the example depicted in FIG. 1, the operation environment 160 comprises a picture frame 165 and in some embodiments, the primary user 116' may not want the secondary user 116" to see what is within the picture frame 165 and may set the robot control system 100 to distort or block images within the picture frame 165.

In some embodiments, the one or more cameras 125 comprise at least two video cameras 125 laterally separated such that they produce a stereo two-dimensional image that includes depth information such that the robot may operate in a three-dimensional space. For example, the robot 120 may refer to the stereo image produced by the at least two cameras 125 to determine how far away a target object 162 is from the robot 120. Moreover, the robot 120 may utilize a navigation algorithm to determine X, Y, and Z coordinates using the stereo two-dimensional image to both navigate within the operation environment 160 as well as manipulate objects within the operation environment 160, such as the target object 162.

Referring still to FIG. 1, each arm 126 of the robot 120 is coupled to a robot body 121 of the robot 120 at one end of the arm 126, and an individual manipulator hand 122 at the other end of the arm 126. Embodiments may have one or more arms 126. The degrees of freedom provided by the arm 126 and manipulator hand 122 may depend on the type of robot 120 being controlled. As an example, the manipulator hand 122 may be multi-fingered manipulator such that the manipulator hand 122 may grasp objects (e.g., the target object 162) in a manner similar to that of a human hand. The movement of the arm 126 and manipulator hand 122 may be effectuated by a plurality of actuators, such as servo motors, for example. The actuators may be controlled via signals that are received from the HRI 140, as described in more detail below.

Further, the locomotion base 127 is configured to move the robot 120 throughout a space (e.g., throughout the operation environment 160). The locomotion base 127 may comprise one or more wheels that are driven to transport the robot 120 to and from various locations in accordance with instructions received from the HRI 140. The wheels may be driven by electric motors, for example. Other means for movement may also utilized, such as continuous tracks or moveable legs, for example. The robot 120 may receive instructions from the HRI 140 to autonomously travel from point A to point B. A processor of the robot (e.g. processor 102 of FIG. 2) may then instruct the components of the locomotion base 127 to translate or rotate such that the robot 120 moves from point A to point B accordingly.

Referring still to FIG. 1, each HRI 140 may be configured as a computing device having one or more robot control programs that the user 116 (e.g., the registered user or the remote user) may operate to wirelessly control the robot 120, such as a servant robot. The one or more HRIs 140 may be any device having a display interface 142 interface that is capable of displaying an image of what the robot 120 sees and one or more user input hardware 144 for receiving control instructions from the user 116. The one or more Hills 140 may be a virtual reality unit, a desktop computer, a laptop computer, a netbook, a smart phone, media player, dedicated hardware, etc.

Figure 2:
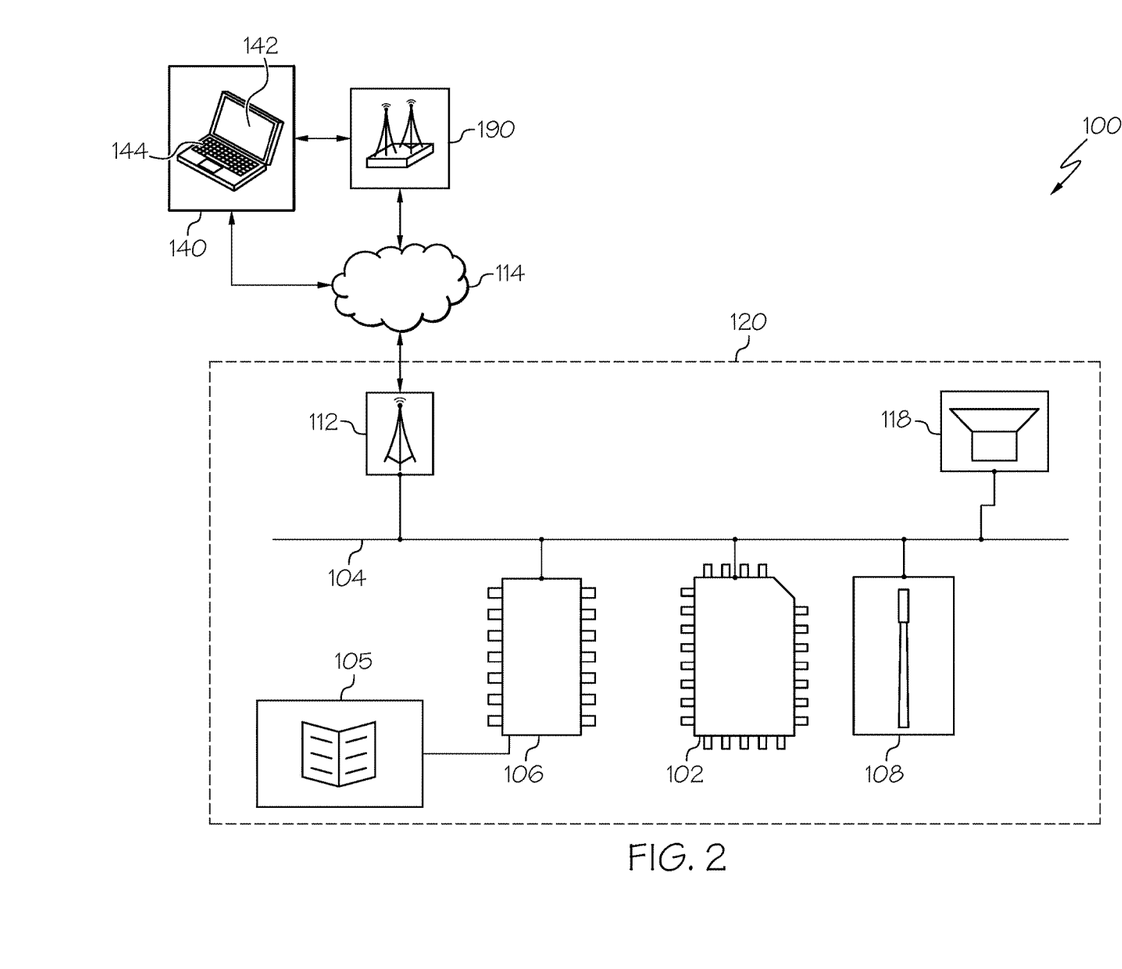
FIG. 2 schematically depicts communicatively coupled components a robot control system according to one or more embodiments described and illustrated herein.

Referring now to FIG. 2, one or more electrical and communicative components of the robot control system 100 are schematically depicted. It is noted that, while the electrical and communicative components of the robot control system 100 are depicted in isolation in FIG. 2, the electrical and communicative components may be included within the HRI 140, the robot 120, or both. As depicted in FIG. 2, the robot control system 100 includes one or more processors 102. Each of the one or more processors 102 may be any device capable of executing machine readable instructions. While FIG. 2 depicts the one or more processors 102 as a component of the robot 120, each HRI 140 and the robot 120 may comprise one or more processors 102. Each of the one or more processors 102 may be a controller, an integrated circuit, a microchip, a computer, or any other computing device.

The one or more processors 102 are coupled to the communication path 104, which provides signal interconnectivity between various modules of the robot control system 100 (e.g., between the robot 120 and the HRI 140 as shown in FIG. 1). Accordingly, the communication path 104 may communicatively couple any number of processors 102 with one another (e.g., the processors 102 of the robot 120 and the HRI 140), allowing the robot 120 and the HRI 140 to operate in a distributed computing environment. As used herein, the term "communicatively coupled" means that coupled components are capable of exchanging data signals with one another such as, for example, electrical signals via conductive medium, electromagnetic signals via air, optical signals via optical waveguides, and the like.

The communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Further, the robot control system 100 comprises one or more memory modules 106 coupled to the communication path 104. While FIG. 2 depicts the one or more memory modules 106 as a component of the robot 120, each HRI 140 and the robot 120 may comprise one or more memory modules 106. The one or more memory modules 106 may comprise RAM, ROM, flash memories, hard drives, or the like. For example, the one or more memory modules 106 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the one or more memory modules 106 are configured to store a set of tangibly embodied executable instructions (i.e. machine readable instructions) that are configured to instruct the one or more processors 102 of the robot 120 and/or the HRI 140 to perform the functionality described herein. The set of executable instructions (e.g., robotic control instructions) may be embodied as one or more robot control programs stored within a computer device, such as a desktop computer or smart phone, for example.

The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The robot control system 100 may further comprise one or more satellite antennas 108 coupled to the communication path 104. While FIG. 2 depicts the one or more satellite antennas 108 as a component of the robot 120, each HRI 140 and the robot 120 may comprise one or more satellite antennas 108. The one or more satellite antennas 108 are configured to receive signals from global positioning system satellites. Specifically, in one embodiment, the satellite antenna 108 includes one or more conductive elements that interact with electromagnetic signals transmitted by global positioning system satellites. The received signal is transformed into a data signal indicative of the location (e.g., latitude and longitude) of the satellite antenna 108 or an object positioned near the satellite antenna 108, by the one or more processors 102. In some embodiments, the satellite antenna 108 may be positioned on the robot 120 may determine location information of the robot 120, for example, information regarding the specific location of the robot 120 within the operation environment 160.

Still referring to FIG. 2, in some embodiments, the HRI 140, the robot 120 and other external devices (such as a remote server) may be communicatively coupled by a network 114. The network 114 may include one or more computer networks (e.g., a personal area network, a local area network, or a wide area network), mobile communications networks, satellite networks and/or a global positioning system and combinations thereof. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable mobile communications networks include, but are not limited to, technologies such as LTE, WiMAX, UMTS, CDMA, and GSM.

Further, each HRI 140, the robot 120 and other external devices (such as a remote server) may be communicatively coupled to the network 114 via wires, via a wide area network, via a local area network, via a personal area network, via a cellular network, via a satellite network, etc. For example, the robot 120 and each HRI 140 may comprise network interface hardware 112 for communicatively coupling the robot 120 and/or the HRI 140 to the network 114 and thereby providing communicative coupling between the robot 120 and each HRI 140. While FIG. 2 depicts the network interface hardware 112 as a component of the robot 120, each HRI 140 and the robot 120 may comprise network interface hardware 112. The network interface hardware 112 can be communicatively coupled to the communication path 104 and can be any device capable of transmitting and/or receiving data via the network 114. Accordingly, the network interface hardware 112 can include a communication transceiver for sending and/or receiving any wired or wireless communication. For example, the network interface hardware 112 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 112 includes hardware configured to operate in accordance with the Bluetooth wireless communication protocol, for example, a Bluetooth send/receive module for sending and receiving Bluetooth communications to/from the robot 120 and the HRI 140.

Still referring to FIG. 2, the robot control system 100 may further comprise one or more feedback devices 118 communicatively coupled to the communication path 104. While FIG. 2 depicts one or more feedback devices 118 as a component of the robot 120, each HRI 140 and the robot 120 may comprise one or more feedback devices 118. The one or more feedback devices 118 may comprise a speaker, a tactile feedback device, or the like. Embodiments comprising a speaker transform data signals from the robot control system 100 into audible mechanical vibrations and embodiments comprising a tactile feedback device may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments, the one or more feedback devices 118 may be part of each HRI 140 such that the robot control system 100 may provide feedback to the user 116.

Referring now to FIGS. 1 and 2, the display interface 142 of the robot control system 100, for example, the display interface 142 of each HRI 140 may be configured as any display device and may incorporate any display technologies, such as liquid crystal display, plasma display, cathode ray tube, electronic ink, etc. The display interface 142 is coupled to the communication path 104 to communicatively couple the display interface 142 to the other components of the robot control system 100, for example, the robot 120 and the one or more cameras 125 of the robot 120. In operation, the display interface 142 may display a two-dimensional image of what the robot 120 sees. In the illustrated embodiment, the display interface 142 is configured as a touch screen such that a user may input commands into the HRI 140 by touching the display interface 142.

The robot control system 100, for example, each HRI 140 further comprises user input hardware 144 communicatively coupled to the communication path 104 such that the user input hardware 144 is communicatively coupled to other components of the robot control system 100, such as the robot 120. The user input hardware 144 may be any device capable of transforming mechanical, optical, or electrical signals into a data signal capable of being transmitted with the communication path 104. Specifically, the user input hardware 144 may include any number of movable objects that each transform physical motion into a data signal that can be transmitted to over the communication path 104 such as, for example, a button, a switch, a knob, a microphone or a keyboard, a mouse, a joystick, or the like. These other user input hardware 144 may be used in conjunction with or in lieu of the touch-screen display interlace 142. Further, in some embodiments, user input hardware 144 may include one or more motion tracking sensors that the user 116 may hold and/or wear the motion tracking sensors such that the control instructions may comprise the user 116 performing desired robot movements while holding and/or wearing the motion control sensors or while the motion control sensors are otherwise affixed to the user 116.

Figure 3:
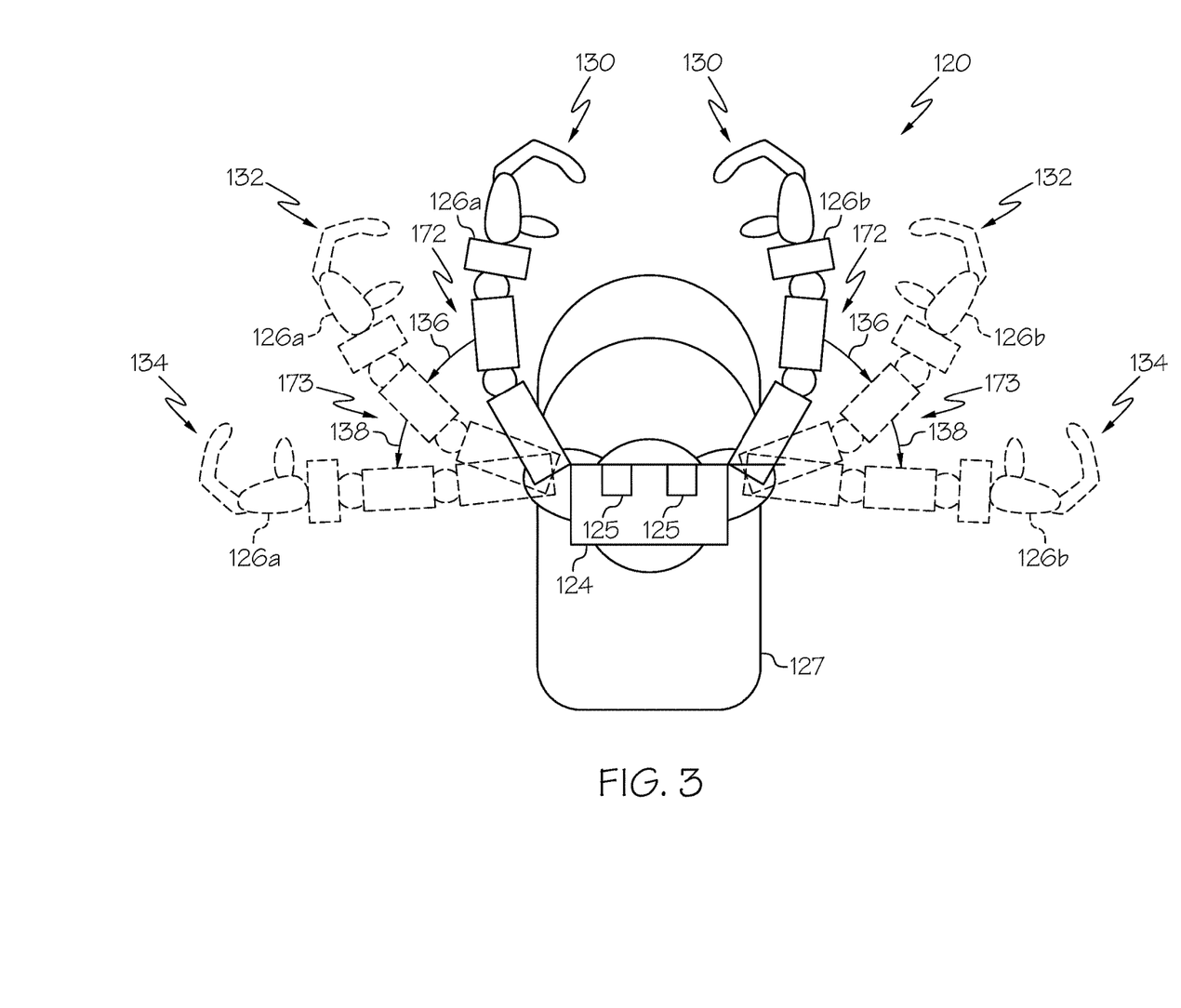
FIG. 3 schematically depicted a plurality of example robotic movements, according to one or embodiments shown and described herein.

Referring now to FIGS. 1-4, the robot control system 100 further comprises a robotic operation library 105 configured as one or more databases stored within the one or more memory modules 106, for example, memory modules 106 of the robot 120 the HRI 140, or both. The robotic operation library 105 may comprise a variety of information regarding the operation of the robot 120, for example, information regarding one or more robotic movements the robot 120 is configured to perform, such as a first robotic movement 136 and a second robotic movement 138 as depicted in FIG. 3, and information regarding the operation environment 160 of the robot 120, an example of which is depicted in more detail in FIG. 4. Further, the robotic operation library 105 comprises information regarding one or more robotic operation constraints.

Robotic operation constraints comprise limitations on the operation of the robot 120 when the robot 120 receives robotic control instructions from the secondary user 116". In other words, the robotic operation constraints refer to a set of rules that limit, for example, prevent, certain operations of the robot 120 when the secondary user 116" is controlling the robot 120. Further, the robotic operation constraints may comprise general robotic operation constraints and/or task specific robotic operation constraints. As used herein "general robotic operation constraints" refer to a set of rules stored in the robotic operation library 105 that limit operation of the robot 120 when the secondary user 116" is controlling the robot 120 during any task. One or more task specific robotic operation constraints comprise a set of rules stored in the robotic operation library 105 that limit operation of the robot 120 when the remote user is controlling the robot 120 during each specific task. Further, the robotic operation constraints may comprise constraints regarding the dates and times that the secondary user 116" may operate the robot 120.

In operation, the primary user 116' may set the one or more robotic operation constraints, for example, using the HRI 140. In some embodiments, the primary user 116' may select robot operation constraints from a preprogrammed set of robotic operation constraints. In other embodiments, the robot control system 100 may generate robotic operation constraints, for example, based on control instructions received by the robot 120 by the primary user 116', when the robot 120 is in a training mode, as described below with respect to FIG. 6. Thus, the primary user 116' may limit the robotic movements the secondary user 116" may instruct the robot to perform, limit the locations that the remote user may instruct the robot 120 to enter, and control the dates and times that the secondary user 116" may operate the robot 120, for example, limiting some or all robotic operations during certain dates and/or times.

As stated above, the robotic operation library 105 comprises information regarding a variety of robotic movements that the robot 120 is configured to perform, for example, in response to receiving robotic control instructions received by the robot 120 from the user 116 (e.g., the primary user 116' or the secondary user 116"), for example, wirelessly via an HRI 140. The robotic control instructions instruct the robot 120 to perform at least one robotic movement that follows a robotic movement pattern. In particular, the robotic control instructions may comprise instructions (e.g., control signals) for the robot 120 to move the locomotion base 127, the one or more arms 126, and/or one or more manipulator hands 122 along the robotic movement pattern, for example using various actuators of the robot 120. In some embodiments, the robotic movement pattern includes a travel pathway for the robot 120 to translate between locations within the operation environment 160 (e.g., using the locomotion base 127). In some embodiments, the robotic movement pattern includes movement patterns for the arms 126 and/or the manipulator hands 122 or other appendages of the robot 120, which may include a pattern for grasping and moving the target object 162, for example, in accordance with a desired task, such as folding laundry, washing dishes, or the like.

In operation, when the secondary user 116" is operating the robot 120, robotic operation constraints may limit certain robotic movements. For example, as depicted in FIG. 3, the robotic operation constraints may set each of the movements that the robot 120 is capable of performing as either an authorized robotic movement 172 or a restricted robotic movement 173. When a robotic movement comprises an authorized robotic movement 172 and the secondary user 116" instructs the robot 120 to perform the robotic movement, the robot 120 will perform the robotic movement. Further, when the robotic movement comprises a restricted robotic movement 173 and the secondary user 116" instructs the robot 120 to perform the robotic movement, the robot 120 will not perform the robotic movement. In some embodiments, authorized robotic movements 172 are the default robotic operation constraint setting such that any movement the robot 120 is capable of performing that is not specified by the primary user 116' as either an authorized robotic movement 172 or an restricted robotic movement 173 defaults to an authorized robotic movement 172. In other embodiments, restricted robotic movements 173 are the default robotic operation constraint setting such that any movement the robot 120 is capable of performing that is not specified by the primary user 116' as either an authorized robotic movement 172 or a restricted robotic movement 173 defaults to a restricted robotic movement 173.

Figure 4:
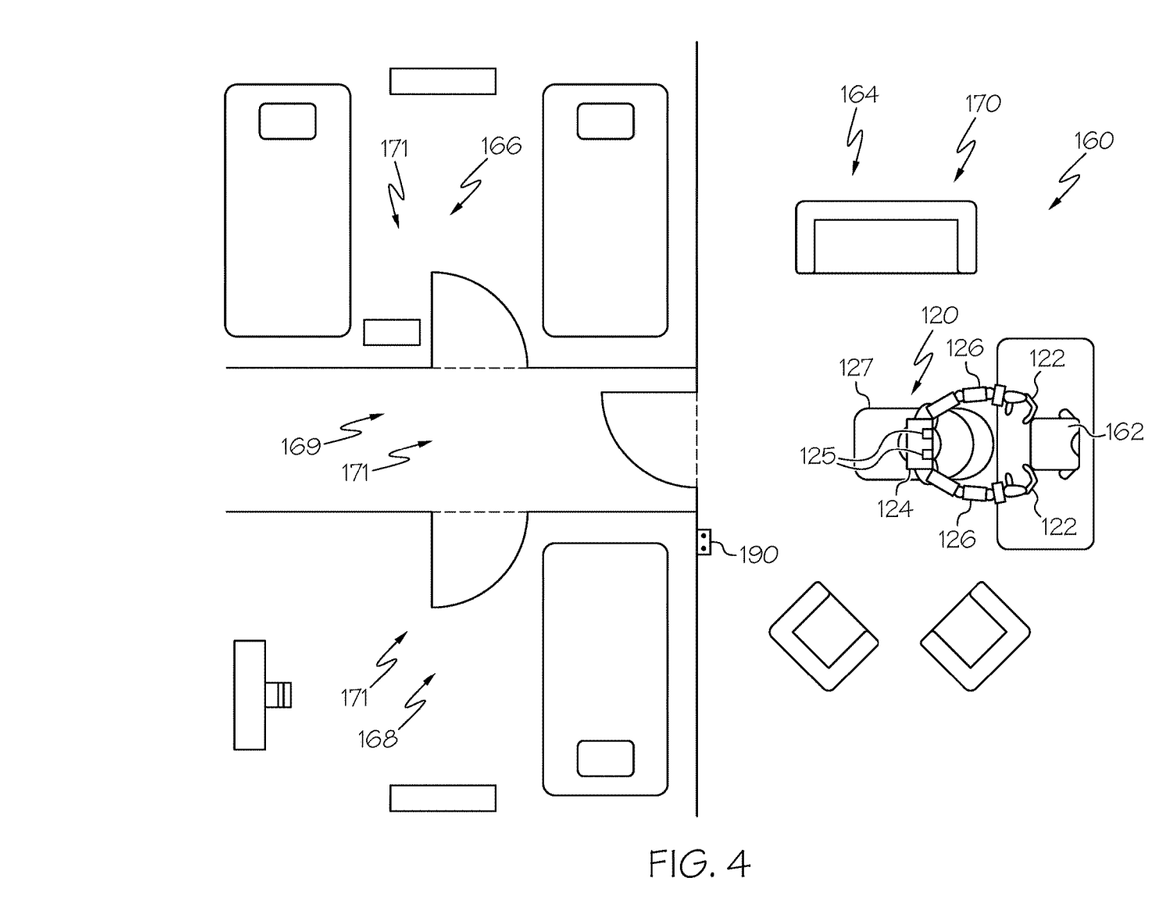
FIG. 4 schematically depicts a robot located in an example operating environment according to one or more embodiments shown and described herein.

Referring now to FIG. 3, an illustrative robot 120 is depicted that comprises a first arm 126a and a second arm 126b that are each moveable between a first arm position 130, and second arm position 132, and a third arm position 134. Both the first arm 126a and the second arm 126b are configured to perform the first robotic movement 136, which comprises moving the arm 126 (the first arm 126a, the second arm 126b, or both) from the first arm position 130 to the second arm position 132. Further, both the first arm and the second arm 126b are configured to perform the second robotic movement, which comprises moving the arm 126 (the first arm 126a, the second arm 126b, or both) from the second arm position 132 to the third arm position 134. In the embodiment depicted in FIG. 3, the first robotic movement 136 comprises the authorized robotic movement 172 and the second robotic movement 138 comprises the restricted robotic movement 173. Further, the robotic operation constraints depicted in FIG. 3 may comprise general robotic operation constraints such that regardless of the task, the secondary user 116" is restricted (e.g., prevented) form performing the second robotic movement 128 or alternatively may comprise task specific robotic operation constraints associated with a subset tasks (which may be one or more tasks) such that the such that second robotic movement 138 is a restricted robotic movement 173 during only the subset of tasks associated with the task specific robotic operation constraints, As stated above, the robotic operation library 105 also includes information regarding the operation environment 160 in which the robot 120 is located including information regarding one or more target objects 162 located in the operation environment 160. As depicted in FIG. 4, an example operation environment 160 comprising a building in which the robot 120 is located is depicted. The example operation environment 160 comprises a plurality of rooms, for example, a first room 164 (in which both the robot 120 and the target object 162 are located) and each of a second room 166, a third room 168, and a hallway 169. When the secondary user 116" is operating the robot 120, robotic operation constraints may limit where in the operation environment 160 the robot 120 may be located (e.g., where the secondary user 116" may instruct the robot 120 to enter). For example, the robotic operation constraints may set regions of the operation environment 160 (e.g., rooms or other spatial portions of the operation environment 160) as authorized regions 170 or restricted regions 171.

In operation, when a region (e.g., a room) in the operation environment 160 comprises an authorized region 170 and the secondary user 116" instructs the robot 120 to move into the authorized region 170, the robot 120 will enter the authorized region 170. Further, when a region (e.g., a room) in the operation environment 160 comprises a restricted region 171 and the secondary user 116" instructs the robot 120 to move into the restricted region 171, the robot 120 will not enter the restricted region 171. Further, in the example operation environment depicted in FIG. 4, the first room 164 is an authorized region 170 each of the second room 166, the third room 168, and the hallway 169 are restricted regions 171. Thus, if the secondary user 116" instructs to the robot 120 to travel from the first room 164 into the second room 166, the robotic operation constraints will prevent that robotic movement.

In some embodiments, authorized regions 170 are the default robotic operation constraint setting such that any region of the operation environment 160 that is not specified by the primary user 116' as either an authorized region 170 or a restricted 171 defaults to an authorized region 170. In other embodiments, restricted regions 171 are the default robotic operation constraint setting such that any region of the operation environment 160 that is not specified by the primary user 116' as either an authorized region 170 or a restricted 171 defaults to a restricted region 171. Further, in some embodiments, restricted regions 171 may comprise locations within furniture, for example, drawers, cabinets, or the like. In this embodiments, the robot operation constraints may prevent the secondary user 116" from instructing the robot 120 to open drawers, cabinets, or the like, that are set as restricted regions 171.

Further, in some embodiments, an individual robotic operation constraint can be applied to the operation of the robot 120 deterministically or probabilistically. An example deterministic robotic operation constraint includes a robotic operation constraint that always prevents the robot 120 from entering a restricted region 171 when instructed to enter the restricted region 171 by the secondary user 116". Further, an example probabilistic robotic operation constraint includes a robotic operation constraint that allows the secondary user 116" to operate the robot 120 in a number of ways when performing a task (e.g., folding laundry) and only prevents robotic movements that have a high probability of not resembling the particular task (e.g., robotic movements that do not resemble clothes folding). Moreover, in some embodiments, when the robot 120 is in the autonomous mode, the robotic operation constraints are not applied. As an example, if a battery of the robot 120 is low, the robot 120 may enter the autonomous mode and autonomously travel to a charging station, even when the charging station is located in a restricted region 171 of the operation environment 160.

Referring still to FIGS. 1-4, the robot 120 (e.g., the one or more memory modules 106 of the robot 120) may be preprogrammed with a floor plan or other map information of the operation environment 160 such that the robot 120 is aware of the layout of the operation environment 160, including the obstacles and other forbidden areas one or more restricted regions 171). Further, the robot 120 may also be equipped with obstacle avoidance sensors, such as IR obstacle avoidance sensors, for example, such that the robot 120 may avoid contact with obstacles. For example, in some embodiments, the robot 120 may override user provided robotic control instructions and avoid contact with obstacles when the robotic control instructions received from the user 116 instruct the robot 120 to contact one or more obstacles (for example, the one or more robotic operation constraints may prevent contact between the robot 120 and obstacles positioned in the operation environment 160). Further, in some embodiments, when the user 116 instructs to robot 120 to move to a location within the operation environment 160, the robot 120 (e.g., the one or more processors 102 of the robot 120) may utilize a route planning algorithm comprising a rapidly-exploring random tree route-planning algorithm to efficiently plan a navigation route while avoiding obstacles that may be present within the operation environment 160. A tree may be constructed within a representation of the space by generating samples within the space and connecting the samples to the closest sample of the tree. The robot navigation route may be selected based on the optimum path between point A and point B.

Referring now to FIGS. 2 and 4, in some embodiments, the robot control system 100 further comprises an external robot control device 190. The external robot control device 190 may be communicatively coupled to the robot 120 any may be configured to output override operation signals to the robot 120, for example, when the secondary user 116" instructs the robot 120 to perform a restricted operation e.g., perform a restricted robotic movement 173, enter a restricted region 171, or the like). For example, the external robot control device 190 may be communicatively coupled to the robot 120 via a personal area network such as, for example, IrDA, Bluetooth, Wireless USB, Z-Wave, ZigBee, and/or other near field communication protocols. Further, the external robot control device 190 may, in some embodiments, not be communicatively coupled to each HRI 140 to communicatively separate the external robot control device 190 from each HRI 140. Thus, in a situation when the secondary user 116" circumvents the restrictions placed on operation of the robot 120 by the robotic operation constraints, the external robot control device 190 may implement the robotic operation constraints and in some embodiments shut down the robot 120 and/or sever communication between the robot 120 and each HRI 140 or at least the HRI 140 operated by the secondary user 116".

Figure 5:
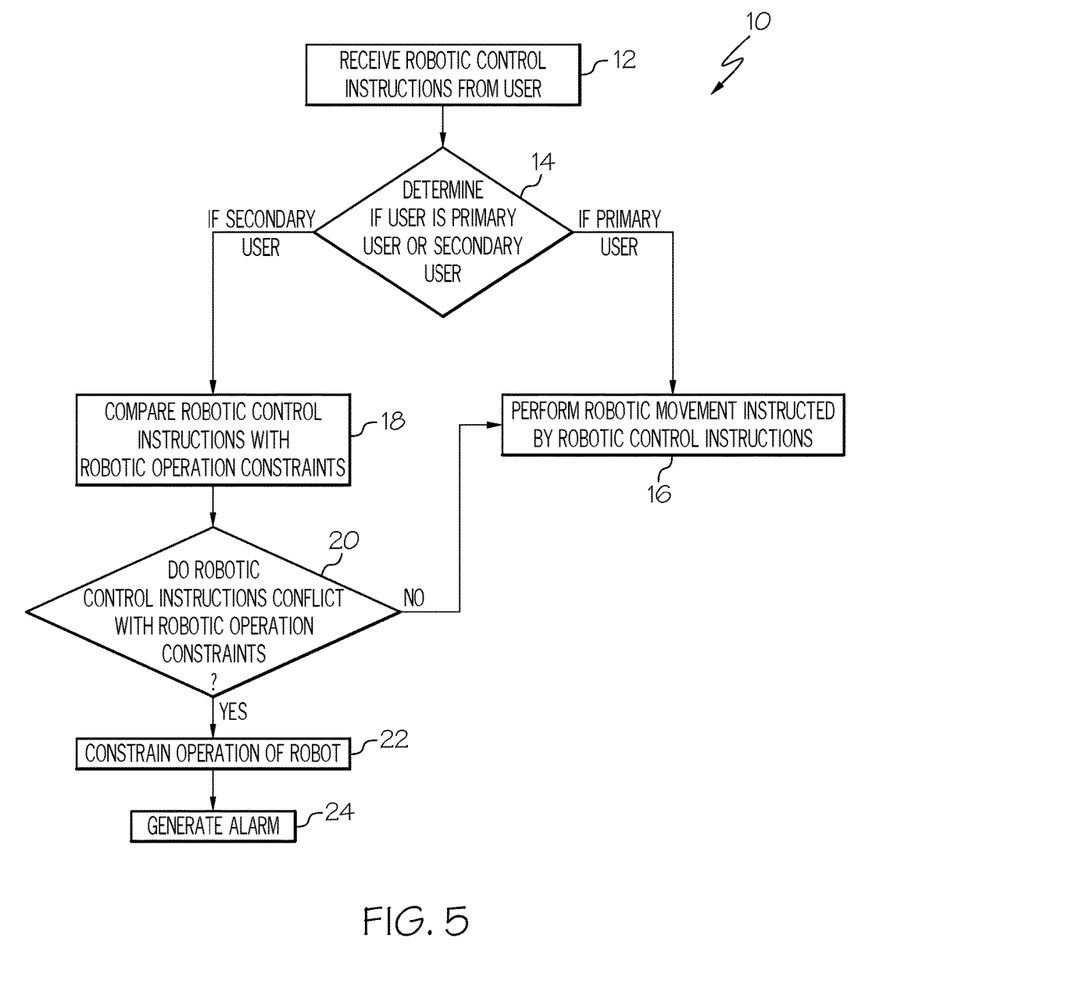
FIG. 5 depicts a flowchart illustrating a method of constraining operation of a robot according to one or more embodiments shown and described herein.

Referring now to FIG. 5, a method of constraining operation of the robot 120 will now be described with specific reference to the flowchart 10 of FIG. 5 and general reference to the other figures. The flowchart 10 depicts a number of method steps, which, while described in a particular sequential order, are not limited to that sequential order. First, at step 12, the method of constraining operation of the robot 120 includes receiving, for example, using the network interface hardware 112 of the robot 120, one or more robotic control instructions from a user 116. The robotic control instructions comprise instructions for the robot 120 to perform at least one robotic movement. Next, at step 14, the method includes, determining whether the user 116 providing the one or more robotic control instructions to the robot 120 is a primary user 116' or a secondary user 116". For example, the user 116 may verify that he or she is the primary user 116' by inputting a passcode or other identification verification into the HRI 140. Alternatively, the user 116 may indicate that he or she is a secondary user 116" by other input into the HRI 140 or the robot control system 110 may determine that the user 116 is a secondary user 116" when no input regarding the identity of the user 116 is received. Referring still to FIG. 5, if the user is the primary user 116', at step 16, the robot 120 performs the at least one robotic movement instructed by the one or more robotic control instructions.

Alternatively, if the user 116 is the secondary user 116", at step 18, the method comprises, comparing, for example, using the processor 102, the one or more robotic control instructions with one or more robotic operation constraints and at step 20, determining whether the at least one robotic control instructions conflict with the one or more robotic operation constraints. If the robotic control instructions conflict with one or more robotic operation constraints, the robot control system 100 constrains (e.g., prevents) the operation of the robot 120 instructed by the one or more robotic control instructions, as indicted by step 22. Alternatively, if the robotic control instructions do not conflict with the one or more robotic operation constraints, the robot 120 performs the at least one robotic movement instructed by the one or more robotic control instructions, at step 16. In some embodiments, at step 24, the method may further comprise generating an alarm using the feedback device 118 when the user 116 is the secondary user 116" and the at least one robotic movement instructed by the one or more robotic control instructions conflicts with the one or more robotic operation constraints.

Figure 6:
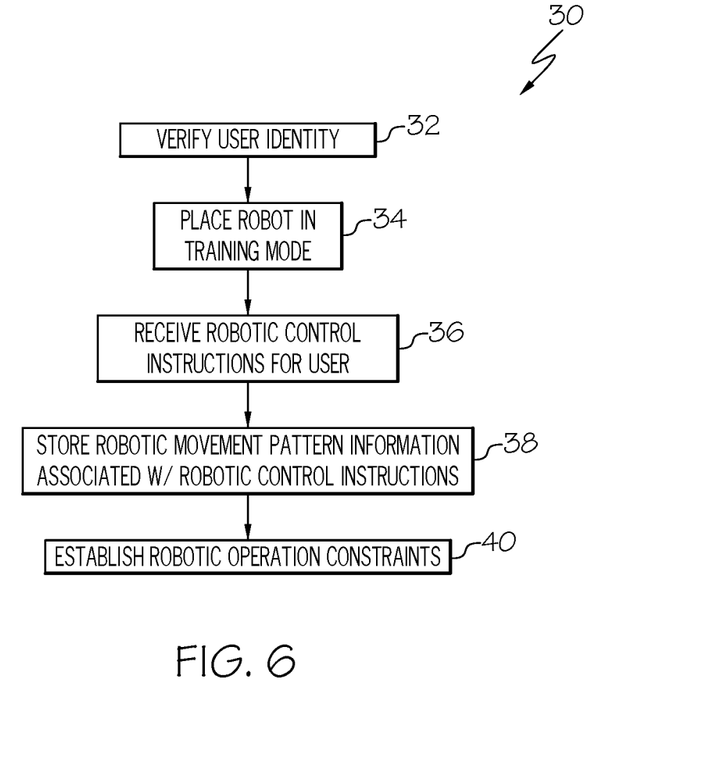
FIG. 6 depicts a flowchart illustrating a method of establishing one or more robotic operation constraints, according to one or more embodiments shown and described herein.

Referring now to FIG. 6, a method of establishing one or more robotic operation constraints for a robot 120 will now be described with specific reference to the flowchart 30 of FIG. 6 and general reference to the other figures. The flowchart 30 depicts a number of method steps, which, while described in a particular sequential order, are not limited to that order. At step 32, the method includes verifying that the user 116 is a primary user 116', for example, by inputting a passcode or other identification verification into the HRI 140. Next, at step 34, the primary user 116' may place the robot 120 into a training mode. As described below, in the training mode, the primary user 116' may learn robotic operation constraints based on robotic control instructions received from the primary user 116'. Next, at step 36, the method comprises receiving, for example, using the network interface hardware 112 of the robot 120, a plurality of control instructions from the user 116 such that the robot performs a plurality of robotic movements, wherein each individual robotic movement is based on an individual control instruction.

Referring still to FIG. 6, at step 38, the method comprises storing robotic movement pattern information regarding each of the plurality of robotic movements, for example, in one or more memory modules 106. The robotic movement pattern information may include information regarding a travel pathway of the robot 120 within the operation environment 160 and movement patterns for the arms 126 and/or the manipulator hands 122 or other appendages of the robot 120. Next, at step 40, the method includes establishing, using the processor 102, one or more robotic operation constraints based on the robotic movement pattern information regarding each of the plurality of robotic movements.

Referring again to FIGS. 3 and 4, the robotic operation constraints may include one or more authorized robotic movements 172, one or more restricted robotic movements 173, one or more authorized regions 170, and one or more restricted regions 171. For example, the one or more authorized robotic movements 172 may comprise each of the plurality of robotic movements performed by the robot 120 during training mode and the one or more restricted robotic movements 173 may comprise one or more robotic movements that are different than each of the plurality of robotic movements performed by the robot 120 during training mode. Further, the one or more authorized regions 170 may comprise locations within the operation environment 160 that the robot 120 was located during training mode and the one or more restricted regions 171 may comprise locations within the operation environment 160 that the robot 120 did not enter and/or was never located during training mode.

Alternatively, in some embodiments, the one or more restricted robotic movements 173 may comprise each of the plurality of robotic movements performed by the robot 120 during training mode and the one or more authorized robotic movements 172 may comprise one or more robotic movements that are different than each of the plurality of robotic movements performed by the robot 120 during training mode. Further, the one or more restricted regions 171 may comprise locations within the operation environment 160 that the robot 120 was located during training mode and the one or more authorized regions 170 may comprise locations within the operation environment 160 that the robot 120 did not enter and/or was never located during training mode.

It should now be understood that methods and systems for providing robotic operation constraints for robots are contemplated. For example, a primary user may set one or more robotic operation constraints such that when a secondary user operates the robot, the robot is constrained, from performing one or more robotic movements that conflict with the one or more robotic operation constraints. Thus, the secondary user may perform one or more tasks for the primary user using the robot, for example, for payment, under certain limitations such that the primary user may limit the robotic movements that the secondary user may instruct the robot to perform and may limit the locations that the secondary may instruct the robot to enter. As such, the robotic operation constraints may improve the security and the privacy of the primary user's home, place of business, or the other place in which the robot is located, while providing the benefits of using the robot, in conjunction with the secondary user, to perform one or more tasks within the operation environment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of constraining operation of a robot, the method comprising:
   receiving, using network interface hardware of a robot, one or more robotic control instructions from a user, wherein the robotic control instructions instruct the robot to perform at least one robotic movement;
   determining whether the user providing the one or more robotic control instructions to the robot is a primary user or a secondary user;
   comparing the at least one robotic movement instructed by the one or more robotic control instructions with one or more robotic operation constraints;
   determining whether the at least one robotic movement instructed by the one or more robotic control instructions conflicts with the one or more robotic operation constraints; and
   constraining operation of the robot when the user is the secondary user and the at least one robotic movement instructed by the one or more robotic control instructions conflicts with the one or more robotic operation constraints.

2. The method of claim 1, wherein:
   the one or more robotic operation constraints comprise one or more authorized robotic movements and one or more restricted robotic movements; and
   the at least one robotic movement instructed by the robotic control instructions conflicts with the one or more robotic operation constraints when the at least one robotic movement comprises at least one of the one or more restricted robotic movements.

3. The method of claim 2, wherein:
the robot is located in an operation environment comprising one or more authorized regions and one or more restricted regions; and
at least one of the one or more restricted robotic movements comprises the robot entering at least one of the one or more restricted regions.

4. The method of claim 1, further comprising establishing the one or more robotic operation constraints by:
verifying that the user is the primary user;
receiving, using the network interface hardware of the robot, a plurality of control instructions from the primary user such that the robot performs a plurality of robotic movements, wherein each individual robotic movement is based on an individual control instruction;
storing robotic movement pattern information regarding each of the plurality of robotic movements; and
establishing the one or more robotic operation constraints based on robotic movement pattern information regarding each of the plurality of robotic movements.

5. The method of claim 4, wherein the one or more robotic operation constraints comprise:
one or more authorized robotic movements comprising each of the plurality of robotic movements instructed by the plurality of control instructions received by the robot from the primary user; and
one or more restricted robotic movements comprising one or more robotic movements that are different than each of the plurality of robotic movements instructed by the plurality of control instructions received by the robot from the primary user.

6. The method of claim 4, wherein the one or more robotic operation constraints comprise:
one or more restricted robotic movements comprising each of the plurality of robotic movements instructed by the plurality of control instructions received by the robot from the primary user; and
one or more authorized robotic movements comprising one or more robotic movements that are different than each of the plurality of robotic movements instructed by the plurality of control instructions received by the robot from the primary user.

7. The method of claim 1, further comprising generating an alarm using a feedback device when the user is the secondary user and the at least one robotic movement instructed by the one or more robotic control instructions conflicts with the one or more robotic operation constraints.

8. The method of claim 1, further comprising:
displaying on a display interface a visual representation of an operation environment in which the robot is located; and
when the user is the secondary user, augmenting the visual representation of the operation environment to distort at least one portion of the visual representation of the operation environment.

9. The method of claim 1, wherein the one or more robotic operation constraints comprise general robotic operation constraints that constrain operation of the robot during each of a plurality of robotic tasks that the robot is configured to perform when the user is the secondary user and the at least one robotic movement instructed by the one or more robotic control instructions conflicts with the general robotic operation constraints.

10. The method of claim 1, wherein the one or more robotic operation constraints comprise task specific robotic operation constraints that constrain operation of the robot during a subset of each of a plurality of robotic tasks that the robot is configured to perform when the user is the secondary user and the at least one robotic movement instructed by the one or more robotic control instructions conflicts with the task specific robotic operation constraints.

11. A robot control system comprising:
a robot comprising network interface hardware;
a human-robot interface apparatus communicatively coupled to the robot;
one or more processors;
one or more memory modules communicatively coupled to the one or more processors; and
machine readable instructions stored in the one or more memory modules that cause the robot control system to perform at least the following when executed by the one or more processors:
receive, using the network interface hardware of the robot, one or more robotic control instructions from a user, wherein the robotic control instructions instruct the robot to perform at least one robotic movement;
determine whether the user providing the one or more robotic control instructions to the robot is a primary user or a secondary user;
compare the at least one robotic movement instructed by the one or more robotic control instructions with one or more robotic operation constraints;
determine whether the at least one robotic movement instructed by the one or more robotic control instructions conflicts with the one or more robotic operation constraints; and
constrain operation of the robot when the user is the secondary user and the at least one robotic movement instructed by the one or more robotic control instructions conflicts with the one or more robotic operation constraints.

12. The robot control system of claim 11, wherein:
the one or more robotic operation constraints comprise one or more authorized robotic movements and one or more restricted robotic movements; and
the at least one robotic movement instructed by the robotic control instructions conflicts with the one or more robotic operation constraints when the at least one robotic movement comprises at least one of the one or more restricted robotic movements.

13. The robot control system of claim 12, wherein:
the robot is located in an operation environment comprising one or more authorized regions and one or more restricted regions; and
at least one of the one or more restricted robotic movements comprises the robot entering at least one of the one or more restricted regions.

14. The robot control system of claim 11, further comprising a feedback device communicatively coupled to the robot and configured to generate an alarm when the user is the secondary user and the at least one robotic movement instructed by the one or more robotic control instructions conflicts with the one or more robotic operation constraints.

15. The robot control system of claim 11, wherein the human-robot interface apparatus comprises a display interface configured to display an augmented visual representation of an operation environment in which the robot is located.

16. The robot control system of claim 11, further comprising an external robot control device communicatively coupled to the robot.

17. A method of establishing one or more robotic operation constraints, the method comprising:

receiving, using network interface hardware of a robot, a plurality of control instructions from a user such that the robot performs a plurality of robotic movements, wherein each individual robotic movement of the plurality of robotic movements is based on an individual control instruction of the plurality of control instructions;

storing robotic movement pattern information regarding each of the plurality of robotic movements in one or more memory modules; and establishing, using a processor communicatively coupled to the one or more memory modules, the one or more robotic operation constraints based on robotic movement pattern information regarding each of the plurality of robotic movements.

18. The method of claim 17, wherein the one or more robotic operation constraints comprise:

one or more authorized robotic movements comprising each of the plurality of robotic movements associated with the plurality of control instructions received from the user; and one or more restricted robotic movements comprising one or more robotic movements that are different than each of the plurality of robotic movements associated with the plurality of control instructions received from the user.

19. The method of claim 17, wherein the one or more robotic operation constraints comprise one or more authorized regions of an operation environment and one or more restricted regions of the operation environment.

20. The method of claim 17, further comprising verifying that the user is a primary user.

* * * * *